March 26, 1968 T. J. DUNSHEATH 3,374,962

TAPE TENSION CONTROL FOR A TAPE RECORDER

Filed June 23, 1965 3 Sheets-Sheet 1

THOMAS J. DUNSHEATH
INVENTOR

BY Anderson, Luedeka, Fitch, Even & Tabin
ATTORNEYS

March 26, 1968 T. J. DUNSHEATH 3,374,962

TAPE TENSION CONTROL FOR A TAPE RECORDER

Filed June 23, 1965 3 Sheets-Sheet 2

THOMAS J. DUNSHEATH
INVENTOR

BY Anderson, Luedeka, Fitch, Even & Tabin
ATTORNEYS

March 26, 1968 T. J. DUNSHEATH 3,374,962

TAPE TENSION CONTROL FOR A TAPE RECORDER

Filed June 23, 1965 3 Sheets-Sheet 3

THOMAS J. DUNSHEATH
INVENTOR

BY Anderson, Luedeka, Fitch, Even & Tabin
ATTORNEYS

United States Patent Office 3,374,962

Patented Mar. 26, 1968

3,374,962
TAPE TENSION CONTROL FOR A TAPE RECORDER

Thomas Judson Dunsheath, Glenview, Ill., assignor to Ampex Corporation, Redwood City, Calif., a corporation of California Filed June 23, 1965, Ser. No. 466,289
12 Claims. (Cl. 242—55.12)

ABSTRACT OF THE DISCLOSURE

A tape tension control maintains a relatively constant tension in the magnetic tape. Tape tension is sensed by a lever having two sensing guide members displaced from the fulcrum. The torque at one guide is a measure of tape tension whereas the torque at the other guide is related to tape wrap radius. A spring applies reference bias to the tension sensing lever. The spring is fastened to a spring support which is pivoted about a point aligned with the spring when the apparatus is in the record mode position. The support may be pivoted to change the reference bias. Upon release of a brake holding the support in the new position, the action of the spring returns the support to the record mode position.

This invention relates to tape transports for magnetic tape recording and/or reproducing apparatus, and more particularly to a tape tensioning system for use therein.

Tape transports for magnetic tape recording and/or reproducing apparatus generally include supply and takeup reels with the tape extending between the supply and takeup reels. The tape is threaded from the supply reel onto the takeup reel over a series of guides or idler rollers, a recording or reproducing scanning assembly, and a capstan drive. The capstan drive pulls the tape under tension from the supply reel and the takeup reel is driven to maintain tension on the tape between it and the capstan drive. It is necessary to maintain a relatively constant tension on the tape between the supply reel and the capstan drive in order to avoid electrical distortion and the throwing of tape loops. One such means of providing the desired tension is known as a tape tension servo brake which serves to regulate the tension on the tape and hold variations in tape tension within a certain regulating range. Such a device may include a tension lever to which a countermoment bias is applied by a reference spring. The lever carries a tape guide and controls a brake for the supply reel by means of mechanical feedback. As the tape passes over the guide, the lever responds to variations in tape tension sensed by the guide to adjust the brake. The brake is adjusted just enough to offset the variation in tape tension by "feeding back" a compensating variation in the drag placed on the tape by the supply reel brake.

There are several significant sources of variation in tape tension in such a tape transport. One of these sources is variation in coefficients of friction at the various places where the tape passes over the guides and at the braking surfaces. Another source is the variation in the supply reel tape wrap radius due to reel eccentricities and uneven tape pack, and due to the tape being unwound from the reel. These latter variations affect the wrap angle on the guide closest to the supply reel and also affect the moment being exerted against the supply reel brake by the tape being withdrawn from the supply reel.

To make the regulating range or variation in tape tension as small as possible, relatively high gain mechanical feedback is required in a tape tension servo brake of the type described. This may be achieved by placing the fulcrum of the tension lever at a point where the moment arm of the tape tension force exerted on the lever through the guide is much longer than the moment arm of the force applied by the lever to adjust the brake. The feedback gain which may be attained in this manner is limited, however, by the fact that excessively high gain may subject the servo loop to oscillation, render it too sensitive to errors in adjustment, and require such close manufacturing tolerances in the elements as to make the manufacture of the device extremely expensive.

It is an object of this invention to provide an improved tape transport for magnetic tape apparatus.

Another object of the invention is to provide an improved tape tension system for magnetic tape apparatus, which system compensates for changes in tape tension due to variation in supply reel tape wrap radius and variation in friction coefficients.

A further object of the invention is to provide a tape tension servo mechanism which does not depend upon directly sensing changes in tape tension due to changes in supply reel tape wrap radius in order to compensate for such changes.

In a tape tension servo brake of the type described, the reference spring which supplies a countermoment bias to the tension lever helps establish a particular reference moment on the lever which is equal to the sum of the moments produced on the lever by tape tension forces and by the braking force. When magnetic tape recording and reproducing apparatus is being used to record, the reference spring is placed such that the countermoment bias is established at a predetermined reference value which will produce a corresponding tape tension. When the apparatus is being used to reproduce, this countermoment bias is manually adjusted (or in some cases automatically adjusted) to optimize reproduction by compensating for variations in tape dimension due to ambient temperature, etc. These two functions may require excessively complex mechanical arrangements for their accomplishment. This is especially true when it is desired to provide an adjusting mechanism for the reference spring which not only permits adjustment of the countermoment bias for reproduction and permits consistent return thereof to the predetermined reference value, but permits adjustment of the predetermined reference value as well.

Accordingly, it is another object of this invention to provide a tape tensioning system wherein the countermoment bias on the tension lever of the tape tension servo brake is readily adjustable for reproducing and may be automatically returned to a predetermined reference value for recording.

A further object of this invention is to provide an improved low-cost reference spring adjusting mechanism for a tape tension servo brake.

A still further object of the invention is to provide an improved reference spring adjusting mechanism for a tape tension servo brake, which mechanism provides for ready adjustment of the predetermined reference value of the countermoment bias for recording.

In accordance with the invention, a tape transport for magnetic tape recording and reproducing apparatus includes a support for a supply reel of magnetic tape. A brake is coupled to the support. The tape is drawn from the supply reel through a tape tension sensing system which is coupled to the brake for adjusting the resistance offered by the supply reel to the tape being withdrawn in response to variations in the supply reel tape wrap radius and coefficients of friction to maintain a relatively constant tension in the tape. The tape tension system includes a lever which is pivotal about a fulcrum to apply a variable moment to adjust the brake and to which is attached a reference spring for supplying a predetermined countermoment bias. The lever has a pair of spaced tape guides thereon positioned to engage and bend the tape as it passes the tape guides. The tape tension forces act upon the guides to produce a net tape tension moment on the lever. The tape guides are disposed in relation to each other and the pivot point so that as the supply reel tape wrap radius decreases an increase in the net tape tension moment is produced without an increase in tape tension.

The invention further provides a mechanism for adjusting the countermoment bias applied to the lever by the reference spring. This mechanism includes a pivotally mounted adjusting member having a spring supporting portion. The reference spring connects the spring supporting portion of the adjusting member to the tape tension lever for applying the countermoment bias to the lever. The adjusting member has a pivot point aligned with the force of the reference spring when the spring is in its normal position. The point is positioned beyond the points of connection of the spring to avoid any over center action. A linkage is provided for pivoting the adjusting member to adjust the moment arm of the force applied by the reference spring to the lever and thereby to adjust the countermoment bias applied to the lever by the reference spring. The linkage may be released to permit the reference spring to return the adjusting member to the position wherein the force of the spring is aligned with the pivot point. Means may also be provided for adjusting the pivot point in an arcuate path about the end of the reference spring connected to the lever; this also adjusts the moment arm of the force applied to the lever by the reference spring to permit adjustment of the reference moment applied to the lever by the reference spring in the normal position.

Other objects and features of the invention will be apparent from the following description taken in connection with the accompanying drawings wherein.

I. THE TAPE TRANSPORT

Figures 1, 4:
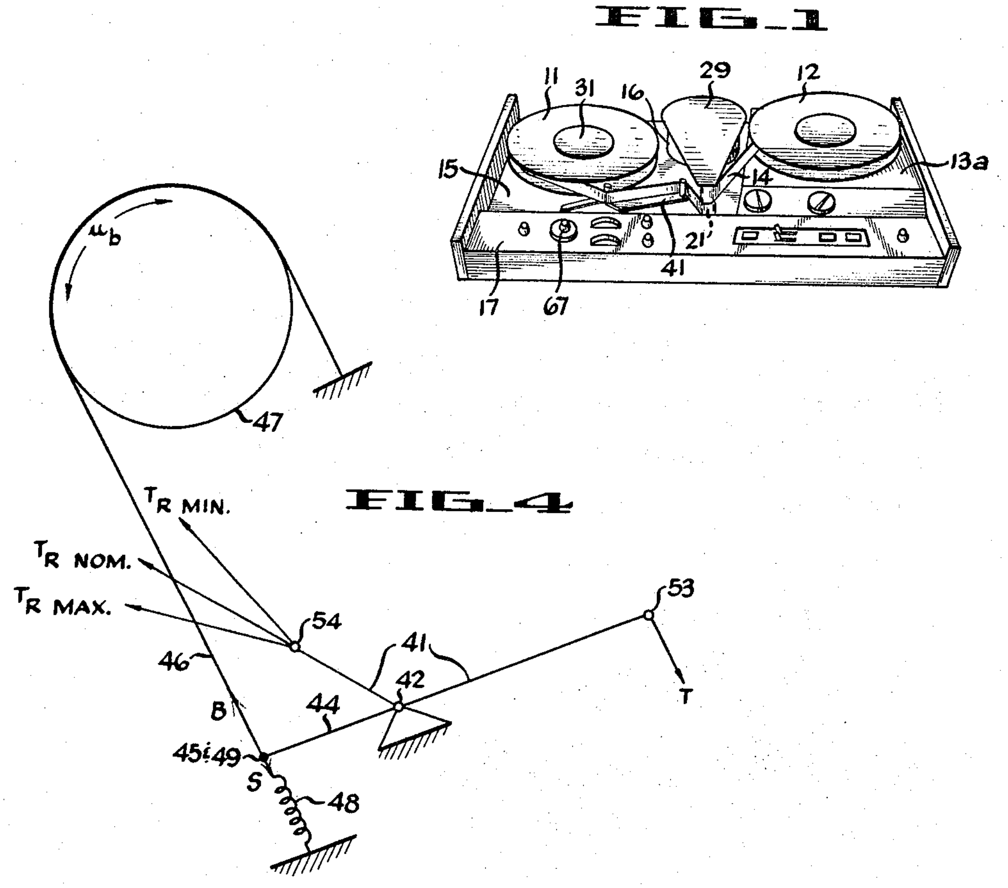
FIGURE 1 is a perspective view, on a reduced scale, of magnetic tape recording and reproducing apparatus incorporating the invention.
FIGURE 4 is a schematic diagram illustrating some of the forces present in the tape tensioning system of the invention.

Referring now more particularly to the drawings, a tape transport for magnetic tape recording or reproducing apparatus is shown. The tape transport shown herein is not necessarily the only type of transport which could incorporate the invention, and is shown for the purposes of illustration only. The tape transport includes supply and takeup reels 11 and 12 mounted for rotation upon a deck 13 at spaced positions thereon, serving to store the magnetic tape 14. As may be seen in FIGURE 1, the deck 13 is covered by a panel 15 with appropriate openings for the guides and other elements to be subsequently described. A control panel 17 is mounted over the front part of deck 13 for supporting the mechanical and electrical controls of the apparatus. The supply reel 11 is mounted upon the deck surface proper, while the takeup reel 12 is mounted upon a raised portion 13*a* of the deck surface, so as to be elevated with respect to the supply reel for purposes subsequently described. The supply and takeup reels may be coupled to separate electric drive motors or to a single motor driving system (neither of which is shown) in a suitable manner. The motors are arranged to maintain tape tension and to wind up tape on the takeup reel during normal operation. The length of tape 14 extending between the reels 11 and 12 is wrapped helically about a scanning assembly 16. The scanning assembly has a generally cylindrical outer surface and may include a rotating head 16*a* for engaging the tape as it passes helically around the outer surface of the scanning assembly 16. The head operates to record information on the tape or to produce electrical signals from information already recorded on the tape.

In order to facilitate driving and guidance of the tape helically about the scanning assembly, a rotatable capstan 21 is mounted upon the deck 13 in forwardly spaced parallel relation to the cylindrical scanning assembly 16. The capstan pulls the tape from the supply reel and the takeup reel is driven to take up the tape after it leaves the capstan for the second time. Uniformly cylindrical entrance and exit guide posts 24 and 26 are mounted upon the deck close to the periphery of scanning assembly 16 and on opposite sides of a line between the scanning assembly and capstan axes. The posts are parallel to the axis of scanning assembly 16. In addition, a pair of spindles 27 and 28 are mounted upon the deck 13 on opposite sides of the line between the capstan and scanning assembly axes at points between the capstan and the posts. The tape leaving the supply reel extends around the lower portion of the capstan 21, about the downwardly tapered lower half of spindle 27, through the gap between posts 24 and 26, around the entrance post 24 and tangentially upon the lower portion of scanning assembly 16.

By virtue of the shape of spindle 27, the tape is twisted slightly to slant the upper edge thereof inwardly toward the line between the capstan and scanning assembly axes. This twist causes the tape entering the scanning assembly to follow a rising path as it extends substantially 360° around the scanning assembly to the exit post 26. The tape thus extends about the scanning assembly in a helical wrap. The taper of the spindle 27 is selected, moreover, to impart a pitch to the helical wrap which advances the tape vertically by substantially one entire width of the tape in passing around the scanning assembly 16 to a point adjacent the exit post 26. The tape then tangentially leaves the upper drum to extend around the exit post 26 and through the gap between the posts 26 and 24.

The departing tape extends around the upwardly tapered upper half of spindle 28 and around the upper portion of the capstan 21 onto the takeup reel 12. A twist is applied to the tape as it extends about the upper half of spindle 28. The taper of the upper half of this spindle is equal but opposite to that of the lower half of the spindle 27 such that the tape is twisted to slant the upper edge thereof outwardly from a line between the scanning assembly and capstan axes by an amount equal to the inward slant of the upper edge arising from the original twist effecting the helical wrap. Thus, the departing tape is returned to a path lying in a plane parallel with the deck 13 before it reaches the capstan such that the tape extends uniformly thereabout and is directed uniformly tangentially upon the takeup reel without wrinkling or twisting. As previously noted, by virtue of the helical wrap the tape rises in passing around the scanning assembly and it is for this reason that the takeup reel is mounted in elevated position upon the raised portion 13*a*. A pair of transducing heads 31 and 32 are provided to engage the tape between the capstan and the spindles 27 and 28 both as it approaches and as it leaves the scanning assembly 16. A pair of guides 33 and 34 are provided adjacent the transducing heads 31 and 32 to cooperate therewith in providing the proper tape path between the capstan 21 and the spindles 27 and 28. As shown in FIGURE 1, the scanning assembly 16, the capstan 21, and all of the elements disposed therebetween may be covered by a decorative and protective panel 29.

Although the guidance arrangement of the tape transport illustrated in the drawings and herein described is such as to provide an "Omega" helical wrap about the scanning assembly 16, it is to be noted that this specific form of wrap is purely exemplary and that other wraps, helical or otherwise, extending exactly 360° or substantially less than 360° may as well be employed with the invention by appropriate modification of the tape guidance system. A 180° wrap may, for example, be employed with two heads mounted at diametrically opposite points of the head drum to facilitate recording and playback of tracks containing complete fields of a television signal, as opposed to complete frames recorded and reproduced by a single head scanning the tape in a substantially 360° wrap.

II. THE TAPE TENSION SERVO BRAKE

A desideratum in helical scan magnetic tape recording or reproducing apparatus is that the tension of the tape be carefully controlled at all times. The accuracy of the timing information of the video signal is dependent upon maintaining accurate and stable tape dimensions. A known device for maintaining the tape tension at a constant value as it enters the scanning assembly is a mechanical tape tension servo brake. Such a device is simple and reliable and does not dissipate heat or require the use of large amounts of electric power. Tape tension servo brakes generally utilize a brake on the supply reel for resisting the withdrawal of tape from the reel by the capstan in order to place the tape under tension. In all designs of mechanical tape tension servo brakes, the tension of the tape is sensed by some form of mechanical deflection and this implies the use of a movable arm or lever. Some systems of this type have linked the arm or lever directly to a brake band which engages the periphery of a brake drum coupled to the supply reel. The tape passes over a guide on the lever, and a variation in tape tension produces a change in the force exerted on the guide by the tape. This change in force produces a change in the moment on the lever produced by tape tension forces, and this change in moment is translated by the lever into a corresponding change in the force on the brake band to effect a change in the drag or resistance to rotation placed upon the supply reel by the brake drum. The mechanical advantage of the forces applied to the lever by the tape tension over the forces applied to the brake band by the lever determine the gain in the mechanical feedback from the tape to the brake.

A difficulty with mechanical feedback systems utilized for regulating tension lies in the disproportionality inherent in any feedback system. Thus, any change in the tape tension will result in a correction of the tape tension to a value which differs from the desired or nominal value of tension by an amount which is a function of the change. This difference or error can be diminished in accordance with known principles by increasing the gain of the feedback loop. The feedback gain which may be designed into the system is limited, however, by the fact that excessively high gain may subject the servo loop to oscillation, render it too sensitive to errors in adjustment, and require such close manufacturing tolerances in the elements as to make the manufacture of the device extremely expensive.

Variations in tape tension can be produced by variations in the coefficients of friction at various points where the tape engages the guides, and at the area of contact between the brake band and the brake drum. Tape tension variations can also be produced by variations in the tape wrap radius on the supply reel due to reel eccentricity and due to the tape unwinding from the reel. The tape wrap radius as defined, for the purposes of this specification and claims, as being the distance from the tangent point of the tape leaving the supply reel to the axis of rotation of the reel. Variation in tape wrap radius causes variation in tape tension for two reasons. First, the moment arm which the tape tension force exerts on the supply reel brake drum decreases as the tape moves closer to the reel axis due to unwinding or eccentricities, thereby reducing the moment applied to the reel to overcome the drag placed on the reel by the brake. The other factor is that the angle of wrap on the guide toward the supply reel, that is, the first guide which the tape engages after leaving the supply reel, will be changed in accordance with the varying tape wrap radius, thereby varying the drag placed on the tape due to friction about the first guide.

Although variations in the coefficients of friction at various points in the tape path are virtually impossible to anticipate, the effects on the tape tension of the changing tape wrap radius on the supply reel are determinable with reasonable accuracy. This invention compensates the tape tension system in accordance with the determinable variations in tape tension due to changing tape wrap radius on the supply reel in a manner separate from the manner in which compensation is provided therein for variation in tape tension due to variation in coefficients of friction. Variations in coefficients of friction are treated by sensing variations in tape tension in accordance with known techniques, whereas variations in tape wrap radius on the supply reel are sensed in a unique manner which provides an overall reduction in the excursions of the regulated tape tension from the nominal tension value. Although friction coefficient variations are still treated in a manner wherein the difference between regulated tension and nominal tension is a function of the sensed change in tension, such variations are generally of lesser degree than the variations in tape tension caused by variations in supply reel tape wrap radius and, consequently, the effect is an overall reduction in the range over which the tape tension may vary.

Figure 2:
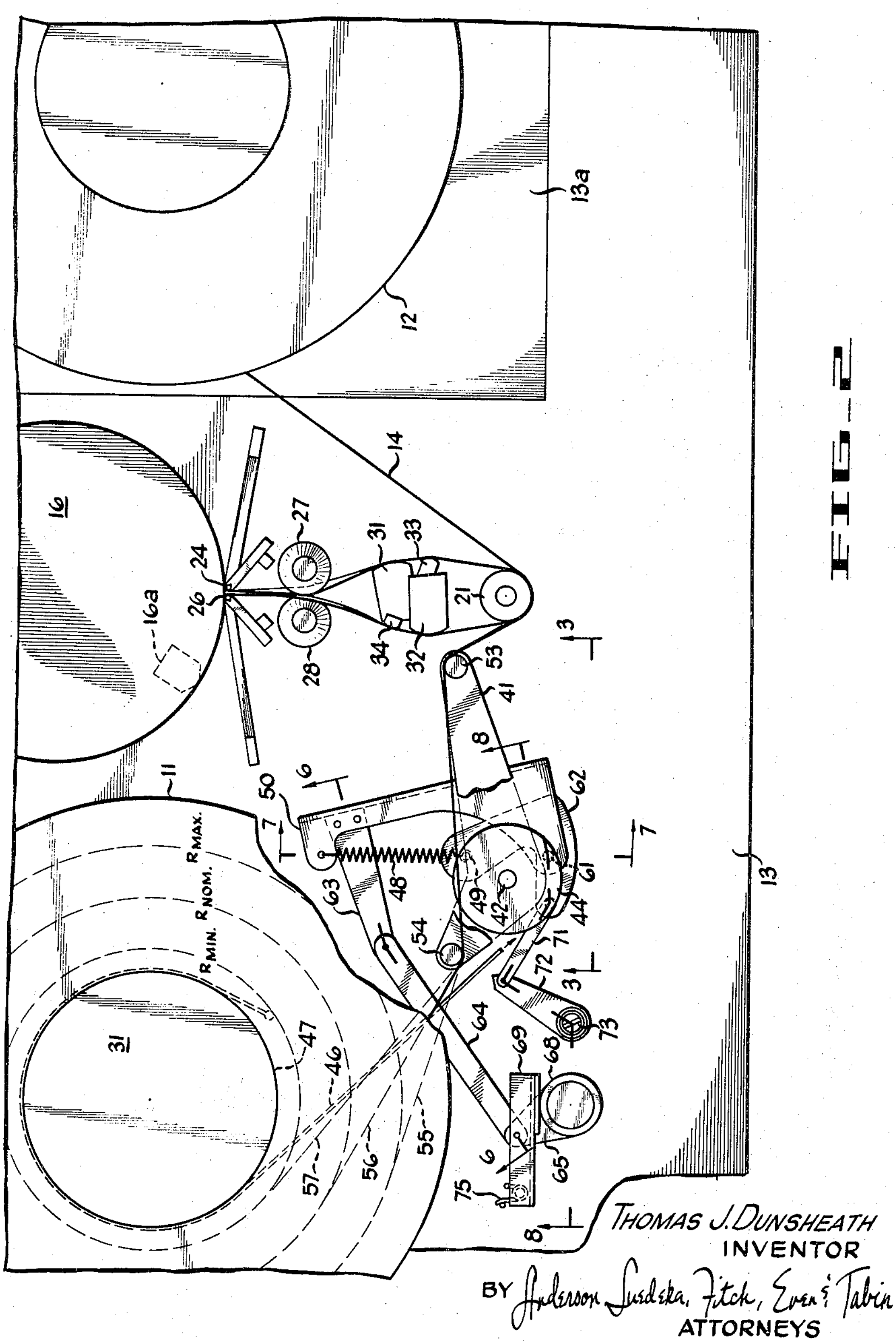
FIGURE 2 is a plan view of the tape transport of the apparatus of FIGURE 1 with all cover panels removed.
Figure 3:
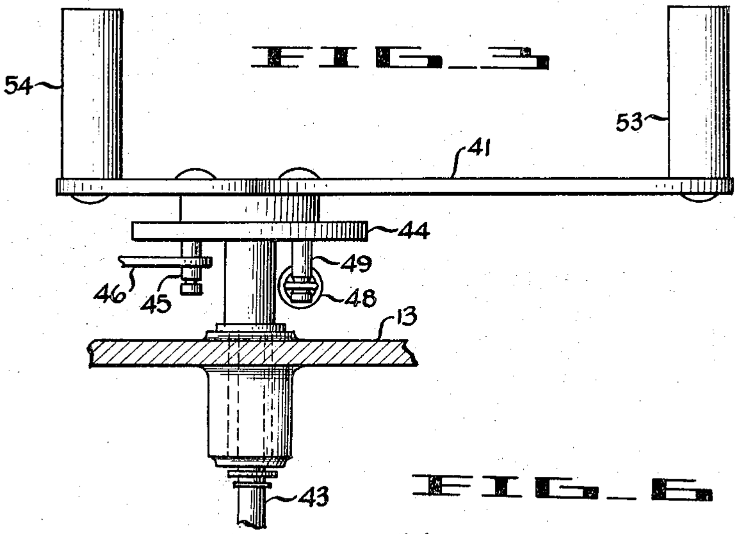
FIGURE 3 is an enlarged sectional view taken along the line 3—3 of FIGURE 2 but with only those elements most directly associated with the tension lever shown, for purposes of clarity.
Figure 6:
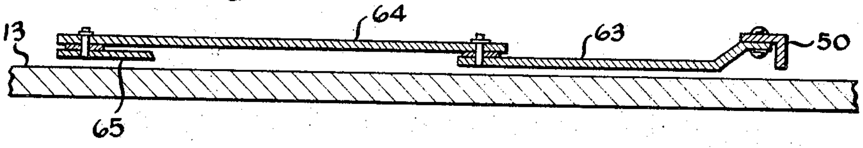
FIGURE 6 is an enlarged sectional view taken along the line of 6—6 of FIGURE 2.
Figure 7:
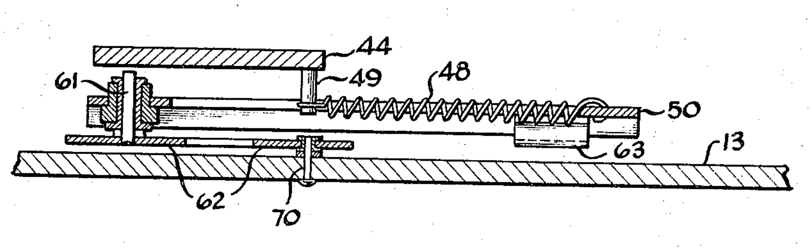
FIGURE 7 is an enlarged sectional view taken along the line 7—7 of FIGURE 2.

In accordance with the invention, a tape tension lever 41 is pivotally mounted on the deck 13 by means of a post 43 for rotation about a fulcrum 42 (see FIGURES 2 and 3). The lever 41 includes a disc 44 secured to be pivotal therewith. A post 45 extends downwardly from disc 44, and one end of a brake band 46 is attached thereto. The other end of brake band 46 extends around a brake drum 47 which is secured to the supply reel supporting and driving turntable 31. For the purpose of simplification in the drawing, the portion of turntable 31 which projects into the center of reel 11 is shown as being the same diameter as the brake drum 47, but this need not necessarily be the case. A reference spring 48 has one end attached to a further post 49 extending downwardly from disc 44. The other end of reference spring 48 is secured to a reference spring support member 50 which may, for the present, be assumed to be fixed in position. A pair of tape guides 53 and 54 extend upwardly from the top surface of lever 41 for engaging and bending or deflecting the tape as the tape passes the guides. Guide 54 is located toward reel 11 whereas guide 53 is located toward capstan 21.

The effect of the tape tension servo brake system thus far described may be more readily visualized from FIGURE 4 wherein the system is shown schematically. The forces produced by tape tension acting on the lever are represented by the vectors T and $T_R$. Other forces acting on the lever are the forces exerted by spring 48 (depending on the spring constant) and the force B exerted by the tension in brake band 46. The sum of the moments of these forces about fulcrum 42 will be zero in the equilibrium condition. The force vector T exerted on guide 53 represents the force applied thereat as a result of tension on the tape between guide 53 and capstan 21. This force T is exerted substantially normal to the line between fulcrum 42 and guide 53 and will produce a moment on lever 41 which will be in a clockwise direction and thereby produce a force at points 45 and 49 which will oppose the force exerted thereat by spring 48. The magnitude of the force produced at points 45 and 49 opposing the spring 48 determines the tension on brake band 46 and consequently determines the resistance imposed by the brake drum 47 on the rotation of supply reel 11. An increase in T will increase the clockwise moment produced thereby on lever 41 and will therefore reduce the resistance to rotation imposed on reel 11 by the brake band 46 engaging drum 47. Conversely, a decrease in tension T will cause a resultant decrease in the clockwise moment produced thereby about fulcrum 42 and will result in the spring 48 placing more tension on brake band 46 to increase the resistance to rotation of supply reel 11. Thus, variations in tape tension are sensed at the guide 53 and are fed back to the brake through the lever arrangement described.

The gain of the system might be increased in order to reduce the regulating error by decreasing the length of the portion of the lever between fulcrum 42 and post 45 with respect to the distance between guide 53 and fulcrum 42. Unfortunately, this raises the problems previously mentioned in connection with high gain feedback, and also will result in a situation where variations in the length of brake band 46 due to ambient temperature and moisture conditions cause relatively wide variations in the position of guide 53, producing undesired inaccuracies. Thus, for practical reasons, the feedback cannot exceed a certain level of gain, which may be about 10.

As tape is unwound from supply reel 11, the tape wrap radius of tape on the reel will vary between a maximum (R-Max) and a minimum (R-Min) (see FIGURE 2). These values may be, for example, 4½ inches and 2¼ inches, respectively. The mean or nominal radius would be halfway between these radii and is shown as R-Nom on FIGURE 2. It will be seen from FIGURE 2 (wherein lines 55, 56 and 57 represent the tape paths between guide 54 and reel 11 at R-Max, R-Nom and R-Min, respectively) that as the tape unwinds and the wrap radius moves from R-Max through R-Nom to R-Min, the moment arms of the tape tension force acting through the reel 11 decreases substantially. Since the net tape tension moment on reel 11 must equal the braking moment, if the braking effect remained constant, there would be a considerable increase in tape tension. In addition to decreasing the aforesaid moment arm, the variation in tape wrap radius on the supply reel will also change the angle of wrap of the tape on guide 54 and thus change the tension force in accordance with the changed frictional forces due to changed area of contact. The tape tension force moment arm on drum 47 and the wrap angle on guide 54 will also change in response to eccentricities which may exist in the reel 11 or in the tape wrap about the reel. The variations in tape tension produced by these factors could be readily sensed at guide 53 and fed back to the brake band 46 and through the servo loop. This, however, is subject to the attendant difficulties previously mentioned and, because of the wide variations in tension which result from variations in tape wrap radius, the total effect would be a relatively substantial regulating range of the tape tension. It is this latter range which the system of the invention renders relatively narrow.

In accordance with the invention, the variations in supply reel tape wrap radius are sensed by guide 54. The force vectors on the tape at guide 54 are illustrated in FIGURE 4 by $T_{R\text{-Max}}$, $T_{R\text{-Nom}}$, and $T_{R\text{-Min}}$ which represent, respectively, the direction of tape tension force as the tape winding radius varies between the maximum, nominal and minimum values. Guides 53 and 54 are positioned with respect to the fulcrum 42 such that the moment produced by the effective force vector at guide 54, when added to the moment produced by force vector T, causes the net clockwise moment about fulcrum 42 produced by tape tension forces to decrease as the tape wrap radius decreases. As a result, an increasing force is produced at points 45 and 49 to oppose the spring 48 and relieve tension on brake band 46 to reduce the resistance to rotation of supply reel 11. This relieves the tension in the tape and maintains it at a relatively constant value without relying on sensing the tape tension at guide 53.

The increase in the clockwise moment about fulcrum 42 produced by tape tension forces is accomplished by changing the moment arm of the tape tension force sensed by guide 54. It will be seen that when the force vector $T_{R\text{-Max}}$ is effective, the moment produced by this force about fulcrum 42 will be in opposition to the moment produced by the force represented by vector T about fulcrum 42. As the tape wrap radius decreases, the force vector at guide 54 swings from $T_{R\text{-Max}}$ through $T_{R\text{-Nom}}$ to $T_{R\text{-Min}}$. As the vector swings from $T_{R\text{-Max}}$ to $T_{R\text{-Nom}}$, the moment produced by the forces it represents, opposing the moment produced by the vector T, will decrease to zero. As the force vector at guide 54 moves from the $T_{R\text{-Nom}}$ position to the $T_{R\text{-Min}}$ position, the moment produced by the forces it represents will aid the moment produced by the force of vector T and will gradually increase from zero to a certain value. For purposes of convenience, the direction of $T_{R\text{-Nom}}$ was selected to be aligned with the fulcrum 42. This is not entirely necessary for the function of the invention, however, and it is also not necessary that the moment produced by the force at guide 54 pass through a zero value and change sign. All that is necessary is that the moment produced by the force at guide 54 causes an increase in that moment on level 41 about fulcrum 42 which is produced by tape tension forces. By doing so, the tension on brake band 46 is gradually relieved in accordance with reduction in tape wrap radius on the supply reel. Thus, the brake tension is varied directly in accordance with changes in tape wrap radius rather than by sensing tape tension changes occasioned at guide 53 by such changes in tape wrap radius and feeding back a force through the lever to the brake.

Figure 5:
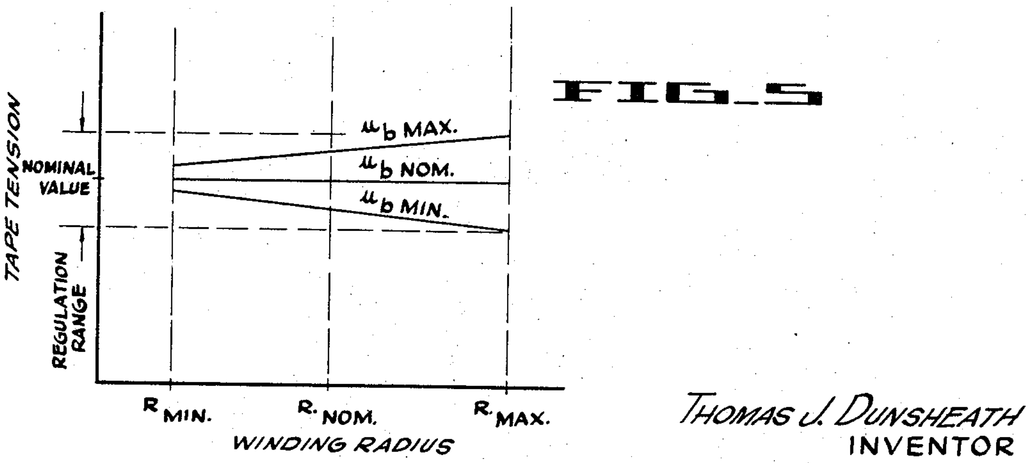
FIGURE 5 is a graph illustrating the variation in tape tension for the system of the invention.

The total variation in tape tension provided by the system of the invention is illustrated qualitatively in FIGURE 5. Each of the three lines represent variations in tape tension between R-Min and R-Max for maximum ($\mu$Max), nominal ($\mu$Nom), and minimum ($\mu$Min) values of brake drum and band coefficients of friction. The effect of variation in the other coefficients of friction would be similar but not as great. It will be seen that the total variation in tape tension is regulated within a relatively narrow range. By constructing the system as described, proportions for the various elements may be determined through appropriate design such that the tendency for increasing tape tension, due to the decreasing moment arm of the tape force around the brake drum 47 and the increasing angle of wrap about guide 54, is offset by the change in the moment arm of the tape tension force at guide 54 about fulcrum 42. By constructing the system in this manner, variations in tape tension resulting from variations in the tape wrap radius on the supply reel are substantially wiped out. Variations in coefficients of friction are treated by mechanical feedback through the sensing of tape tension at guide 53.

To summarize, the lever 41 is constrained from rotation by the fixed connections to the brake band 46 and the spring 48. The sum of the moments on the lever 41 about its fulcrum 42 are therefore equalized or the lever would rotate. Further, the sum of the moment of braking force B and the tape tension moments produced by tape tension forces T and $T_R$ must be equal and opposite to the moment of the spring force S. The spring force S therefore determines a predetermined reference moment. Since the sum of the braking force moment and the tape tension moments remains constant at this reference level, any increase in tape tension moment occasioned by an increase in tape tension decreases the braking force B on the lever. This force is transmitted to the brake, and therefore the braking effect decreases, thereby relieving tension in the tape to keep the tension substantially constant. Further, the braking force B is decreased when an increase in tape tension moment is occasioned by a change in a tape tension moment arm caused by a decrease in tape wrap radius, irrespective of a change in tape tension; by using appropriate geometry this change in braking force occasioned by the change in a tape tension moment arm can be made to counteract variations in tape tension that would otherwise result from variations in the tape wrap radius.

III. THE PLAYBACK TENSION ADJUSTING MECHANISM

In combination magnetic tape recording and reproducing apparatus, recording is generally performed with the reference spring 48 set at a predetermined or fixed reference tension. This will provide a fixed bias to the tension lever 41 and regulate tape tension in the range shown in FIGURE 5 about a desired nominal value. During the playback or reproduce mode of operation it may become necessary to change the bias provided by spring 48 and, hence, the tension on the tape to correct for changes in tape dimension caused by changes in temperature or humidity from that existing when the tape was recorded. For example, if a tape is recorded on a hot day and is played back on a cold day, the tape will have contracted and the time-bias of the reproduced signal will distort. In video reproduction, this distortion will appear as a hook on the top of a monitor. By increasing tape tension while viewing the signal being reproduced, the tape can be stretched over the scanning assembly by an amount sufficient to correct the error.

Figure 8:
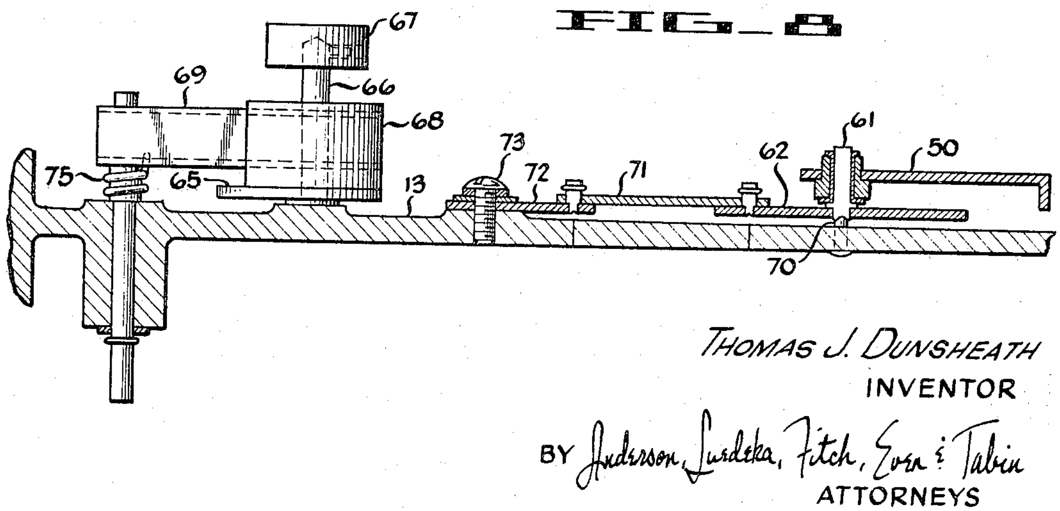
FIGURE 8 is a sectional view taken along the line 8—8 of FIGURE 2.

In accordance with the present invention, a simple mechanism is provided for manually controlling the tension on the tape during the playback or reproduce mode of operation. As previously mentioned, the reference spring 48 is secured at the end opposite the lever 41 to a support structure 50. Support structure 50 is pivotally secured on a pivot post 61 in a link 62. For the present, it may be assumed that link 62 is fixed in its position in relation to the tape deck 13. The mechanism is constructed such that spring 48 is aligned with the pivot post 61 when at the reference tension for recording. A bracket 63 is connected to support member 50 and is coupled through a floating link 64 to a pivot arm 65. Pivot arm 65 is secured to a shaft 66 journaled in the deck 13 (FIGURE 8). A control knob 67 is keyed to the shaft 66. A brake drum 68 is also secured to shaft 66. A brake 69 is biased by a spring 75 against the periphery of brake drum 68 to provide a frictional holding force for positioning the arm 65.

When it is desired to vary the tension on spring 48 and thus adjust the nominal tension on the tape during playback or reproduce mode, knob 67 is adjusted while observing the picture being reproduced. By turning knob 67, the arm 65 is rotated and, accordingly, the support member 50 is also rotated about pivot post 61. When support member 50 is rotated in this manner, the spring will be slightly elongated, but changes in spring force as a result of spring elongation are very slight since the elongation may be less than 5 percent. More significantly, the moment arm of the spring about the fulcrum 42 will change, producing a proportionate change in the reference countermoment, resulting in a proportionate change in the controlled tape tension. In FIGURE 2, a rotation of support member 50 counterclockwise from the position shown will produce an increase in the moment arm of the spring tension about fulcrum 42 whereas a rotation of the support member clockwise from the position shown will produce a corresponding decrease in the moment arm of spring tension about fulcrum 42.

In order to reattain the reference position, all that is necessary is that the brake 69 be momentarily released from drum 68 either manually or by an automatic action. With the brake released, the tension on spring 48 will cause the support member 50 to return to the position wherein the spring is least extended. This position will, of course, be the reference position wherein spring 48 is aligned with the pivot post 61 (the pivot point of support member 50). Since the spring 48 is only moderately extended in pivoting support member 50 from the reference position, only light control forces are required. This suggests that the pivoting of support member 50 might be readily controlled through automatic means rather than manually as shown.

IV. THE RECORD TENSION ADJUSTING MECHANISM

Under certain circumstances it may become necessary to adjust the reference tension of spring 48 to the predetermined value for the record mode of operation. For example, after a period of time the reference tension may drift from the desired value, and of course, when the apparatus is manufactured it is necessary to make an initial setting for proper reference tension. Reference tension adjustment is accomplished in the system of the invention by making the pivot point 61 of support member 50 adjustable. Thus, link 62 is pivotally secured to the chassis by a pivot post 70 and is coupled through a floating link 71 to a pivot arm 72. Pivot arm 72 is clamped in position by a screw 73. When it is desired to adjust the position of pivot post 61, the screw 73 is loosened and arm 72 pivoted until pivot post 61 is in the desired position. Screw 73 is then retightened. By such an operation, the moment arm of spring 48 about fulcrum 42 is changed and the reference moment on lever 41 is changed in a proportionate ratio. It may be necessary to release brake arm 69 to permit the linkage to allow spring 48 to maintain alignment with pivot post 61. Where, as shown, the pivot post 70 of link 62 is aligned with post 49 (although not connected to post 49), the spring extension is not changed when link 62 is pivoted. This means only frictional forces need be overcome during adjusting and the adjustment is therefore easily made and held.

V. CONCLUSION

The tape tensioning system above described serves to compensate tape tension for changes therein due to variation in supply reel tape wrap radius without depending upon direct sensing of the changes in tape tension resulting from such wrap radius variation. In addition, the nature of the structure described and claimed herein is of considerable advantage in designing the system for the particular needs of a given tape transport design. This is because the tape tensioning system of the invention inherently provides a flexibility of design as far as the particular dimensional proportions of the elements are concerned. A satisfactory working device has been constructed in accordance with the invention wherein the distance between fulcrum 42 and guide 53 was approximately 4 inches, the distance between fulcrum 42 and guide 54 was approximately 1¾ inches, and the distance between fulcrum 42 and post 45 was approximately ⅝ inch. The angle between the line from fulcrum 42 to guide 53 and the line from fulcrum 42 to guide 54 was approximately 125°. The angle between the segment of tape extending from guide 53 to capstan 21 and the line from fulcrum 42 to guide 53 was about 77°. The fulcrum 42 was positioned such that the angle between the segment of tape between guide 54 and supply reel 11 and the line from fulcrum 42 to guide 54 varied about 16° on either side of zero for a 4½ inch maximum wrap radius and a 2¼ inch minimum wrap radius. The invention also provides means for adjusting the countermoment reference bias on the tension lever which are relatively simple and which automatically return the reference bias on the lever to a predetermined value for recording upon release of the brake 69. The invention also provides an improved reference spring adjusting mechanism wherein the predetermined value of the countermoment bias for recording is readily adjustable.

Alternatives in configuration and proportions within the teaching of this specification will be obvious to those skilled in the art and are intended to fall within the scope of the appended claims.

What is claimed is:

1. A tape transport for magnetic tape recording or reproducing apparatus, including in combination, support means for rotatably supporting a supply reel of magnetic tape, drive means for withdrawing the tape from the supply reel, brake means coupled to said support means for resisting the rotation of the supply reel as tape is withdrawn therefrom, thereby to place the tape in tension, and tape tension sensing means coupled to said brake means for regulating the tension on the tape, said tape tension sensing means comprising a member pivotal about a pivot point the axis of which is fixed with respect to said support means, said member having first and second tape guide means thereon displaced from said pivot point and positioned to engage and bend the tape as it passes said tape guide means to thereby cause tape tension forces to be applied to said member, said member acting in response to an increase in the moment produced by tape tension forces applied thereto to produce a compensating decrease in the resistance of said brake means to rotation of the supply reel, said first tape guide means being disposed in relation to said pivot point and said support means to cause an increase in the moment about said pivot point produced by tape tension forces applied to said member through said tape guide means as the supply reel tape wrap radius decreases, irrespective of changes in tape tension, said second tape guide means being disposed in relation to said pivot point to cause tension in the tape to produce torque on said member about said pivot point.

2. A tape transport for magnetic tape recording or reproducing apparatus, including in combination, support means for rotatably supporting a supply reel of magnetic tape, drive means for withdrawing the tape from the supply reel, brake means coupled to said support means for resisting the rotation of the supply reel as tape is withdrawn therefrom thereby to place the tape in tension, and tape tension sensing means coupled to said brake means for regulating the tension on the tape, said tape tension sensing means comprising a member pivotal about a pivot point the axis of which is fixed with respect to said support means, said member having a pair of spaced tape guides thereon positioned to engage and bend the tape as it passes said tape guides to thereby cause tape tension forces to be applied to said member, said member acting in response to an increase in the sum of the moments produced by tape tension forces applied thereto to produce a compensating decrease in the resistance of said brake means to rotation of the supply reel, one of said tape guides being disposed in relation to said pivot point and said support means to cause an increase in the sum of the moments about said pivot point produced by tape tension forces applied to said member through said tape guides as the supply reel tape wrap radius decreases, irrespective of changes in tape tension, the other of said tape guides being disposed in relation to said pivot point to cause tension in the tape to produce torque on said member about said pivot point.

3. A tape transport for magnetic tape recording or reproducing apparatus, including in combination, support means for rotatably supporting a supply reel of magnetic tape, drive means for withdrawing the tape from the supply reel, brake means coupled to said support means for resisting the rotation of the supply reel as tape is withdrawn therefrom thereby to place the tape in tension, a lever pivotal about a fulcrum the axis of which is fixed with respect to said support means, spring means providing a predetermined bias movement to said lever in a given direction about said fulcrum, said lever having first guide means thereon positioned to engage and bend the tape and responsive to the tension force on the tape to produce a first tension moment on said lever about said fulcrum in the direction opposite the given direction, said lever having second guide means thereon positioned to engage and bend the tape and responsive to the tension force on the tape to produce a second tension moment on said lever about said fulcrum, said lever being coupled to said brake means to provide an actuating braking force thereto, said braking force reacting on said lever to produce a brake force moment about said fulcrum in a direction opposite the given direction, the sum of said first, second and brake force moments being equal and opposite to said predetermined bias moment, whereby said braking force varies oppositely from variations in said tape tension, said second guide means being disposed with respect to said support means and said fulcrum to provide variation of said second tension moment in response to variation in supply reel tape wrap radius by varying the moment arm of the force producing said second moment, such that the sum of said first and second moments increases in a direction opposite to the given direction as the supply reel tape wrap radius decreases.

4. The combination of claim 3 wherein said second guide means is disposed with respect to said support means such that the tape path between the supply reel and said second guide means will be aligned with said fulcrum at the means tape wrap radius of the supply reel.

5. A tape transport for magnetic tape recording or reproducing apparatus, including in combination, support means for rotatably supporting a supply reel of magnetic tape, drive means for withdrawing the tape from the supply reel, brake means coupled to said support means for resisting the rotation of the supply reel as tape is withdrawn therefrom to place the tape in tension, a lever pivotal about a fulcrum the axis of which is fixed with respect to said support means, spring means providing a bias moment to said lever in a given direction about said fulcrum, said lever having a first guide thereon positioned toward said drive means to engage and bend the tape and translate the tension force on the tape thereat into a first tension moment on said lever about said fulcrum, said lever having a second guide thereon spaced from said first guide and positioned toward said support means to engage and bend the tape and translate the tension force on the tape thereat into a second tension moment on said lever about said fulcrum, said lever being coupled to said brake means to provide an actuating braking force thereto, said braking force reacting on said lever to produce a brake force moment about said fulcrum in a direction opposite the given direction, the sum of said first, second and brake force moments being equal and opposite to said predetermined bias moment, whereby said braking force varies oppositely from variations in said tape tension, said first guide being further positioned on said lever on a line from said fulcrum which is substantially normal to the tape between said drive means and said first guide, said second guide being disposed with respect to said support means and said fulcrum to provide variation of said second tension moment in response to variation in supply reel tape wrap radius by varying the moment arm of the force producing said second tension moment such that the sum of said first and second tension moments increases as the supply reel tape wrap radius decreases.

6. A tape transport for magnetic tape recording or reproducing apparatus, including in combination, support means for rotatably supporting a supply reel of magnetic tape, drive means for withdrawing the tape from the supply reel, a brake drum coupled to said support means to be rotatable with the reel, a spring biased lever pivotal about a fulcrum the axis of which is fixed with respect to said support means, said lever having a first guide post disposed relative to said fulcrum toward said drive means, and a second guide post disposed relative to said fulcrum toward said support means, said guide posts being positioned to produce a double bend in the tape as it passes therebetween to thereby produce first and second tension moments, respectively, on said lever due to tape tension forces, a brake band having a first end connected to said lever at a point thereon displaced from said fulcrum and having a second end fixed with respect to said brake drum such that said band is wrapped at least partially around said brake drum, said lever acting in response to an increase in the sum of said first and second tension moments to decrease the tension placed on said brake band by said spring biased lever to reduce correspondingly the resistance to rotation of the supply reel imposed on said support means by said brake drum to regulate tape tension, said fulcrum being positioned in relation to said first and second guide posts such that variations in the moment arm of tension forces producing said second moment caused by decreasing tape supply wrap radius produce an increase in the sum of said first and second tension moments, whereby the tendency for increasing tape tension due to decreasing tape wrap radius is offset by a reduction in resistance to rotation of the supply reel imposed on said support means by said brake drum.

7. A tape transport for magnetic tape recording or reproducing apparatus, including in combination, support means for rotatably supporting a supply reel of magnetic tape, drive means for withdrawing the tape from the supply reel, brake means coupled to said support means for resisting the rotation of the supply reel as tape is withdrawn therefrom, to place the tape in tension, and tape tension sensing means coupled to said brake means for regulating the tension on the tape, said tape tension sensing means comprising a member pivotal about a pivot point the axis of which is fixed with respect to said support means, said member having a pair of spaced tape guides thereon positioned to engage and bend the tape as it passes said tape guides to thereby cause tape tension forces to be applied to said member, said member acting in response to an increase in the sum of the moments produced by tape tension forces applied thereto to produce a compensating decrease in the resistance of said brake means to rotation of the supply reel, one of said tape guides being disposed in relation to said pivot point and said support means to cause an increase in the sum of the moments about said pivot point produced by tape tension forces applied to said member through said tape guides as the supply reel tape wrap radius decreases, the other of said tape guides being disposed in relation to said pivot point to cause tension in the tape to produce torque on said member about said pivot point, a spring support, a reference spring mounted on said spring support and connected to said member at a point displaced from said pivot point for applying a bias moment to said member, said spring support being pivotally mounted with respect to said support means at a pivot point which is aligned with the direction of the force applied by said reference spring to said member in a reference position, and means for pivoting said spring support about said pivot point thereof from said reference position to adjust the moment arm of the force applied by said reference spring to said member and thereby adjust the moment applied to said member by said reference spring.

8. A tape transport for magnetic tape recording and reproducing apparatus, including in combination, reel support means for rotatably supporting a supply reel of magnetic tape, drive means for withdrawing the tape from the supply reel, first brake means coupled to said reel support means for resisting the rotation of the supply reel as tape is withdrawn therefrom to place the tape under tension, a tension sensing lever having guide means thereon positioned to engage and bend the tape as it passes said guide means, said tension sensing lever being coupled to said first brake means and acting in response to variation in moments applied thereto produced by tape tension forces to vary the resistance of said first brake means to rotation of the supply reel, a spring support member pivotally mounted at a pivot point which is fixed with respect to the fulcrum of said lever and having a first portion, a reference spring connecting said first portion to said lever for applying a bias moment thereto, said pivot point of said spring support member being aligned with said reference spring in a first position of said spring support member and being located beyond the points of connection of said reference spring, a link mechanism coupled to said spring support member for pivoting the same from the first position to adjust the moment arm of the force applied by said reference spring to said lever and thereby adjust the moment coupled to said link mechanism applied to said lever by said reference spring, second brake means for maintaining said spring support member in the position to which it is pivoted, and means for releasing said second brake means to permit said spring to return said support member to the first position wherein said spring is aligned with said pivot point.

9. A tape tensioning system for a tape transport in magnetic tape apparatus operable in record and reproduce modes, said system including in combination, a tension sensing lever for controlling tape tension in accordance with moments applied thereto, a spring support member pivotally mounted with respect to the fulcrum of said lever at a pivot point and having a first portion, a reference spring connecting said first portion to said lever for applying a bias moment to said lever, said pivot point of said spring support member being aligned with said reference spring in record mode position and being disposed beyond the points of connection of said reference spring, a link mechanism for pivoting said spring support member to adjust the moment arm of the force applied by said reference spring to said lever and thereby adjust the moment applied to said lever by said reference spring for a desired tape tension when the apparatus is operating in reproduce mode, a brake for maintaining said spring support member in the position to which it has been pivoted, and means for releasing said brake when the apparatus is operating in record mode to permit said spring to return said spring support member to the record mode position wherein said spring is aligned with said pivot point.

10. A tape tensioning system for a tape transport in magnetic tape apparatus operable in record and reproduce modes, said system including in combination, a tension lever for controlling tape tension in accordance with moments applied thereto, a spring support member pivotally mounted with respect to the fulcrum of said lever at a pivot point and having a first portion, a reference spring connecting said first portion to said tape tension lever for applying a bias moment thereto, said pivot point of said spring support member further being aligned with said reference spring with said spring support member in record mode position and being disposed beyond the points of connection of said reference spring, a link mechanism for pivoting said spring support member from the record mode position to adjust the moment arm of the force applied by said reference spring to said lever and thereby adjust the moment applied to said lever by said reference spring for a desired tape tension when the apparatus is operating in reproduce mode, and means for adjusting the position of said pivot point of said spring support member with respect to said lever for adjusting the moment applied to said lever in the record mode position.

11. The combination of claim 10 wherein said means for adjusting the position of said pivot point of said spring support member comprise an arm to which said spring support member is pivotally secured at said pivot point thereof, said arm being pivotal about a further pivot point which is displaced from said pivot point of said spring support member and which is fixed with respect to the fulcrum of said lever.

12. The combination of claim 11 wherein said further pivot point is axially aligned with the point at which said reference spring is attached to said tension sensing lever.

References Cited

UNITED STATES PATENTS

| | | | |
|---|---|---|---|
| 2,929,573 | 3/1960 | Haugwitz | 242—75.45 |
| 3,076,618 | 2/1963 | Van Hook | 242—75.42 |
| 3,091,410 | 5/1963 | Widener | 242—55.12 |
| 3,139,243 | 6/1964 | Warwick et al. | 242—156.2 |

GEORGE M. MAUTZ, *Primary Examiner.*